Figure 2:
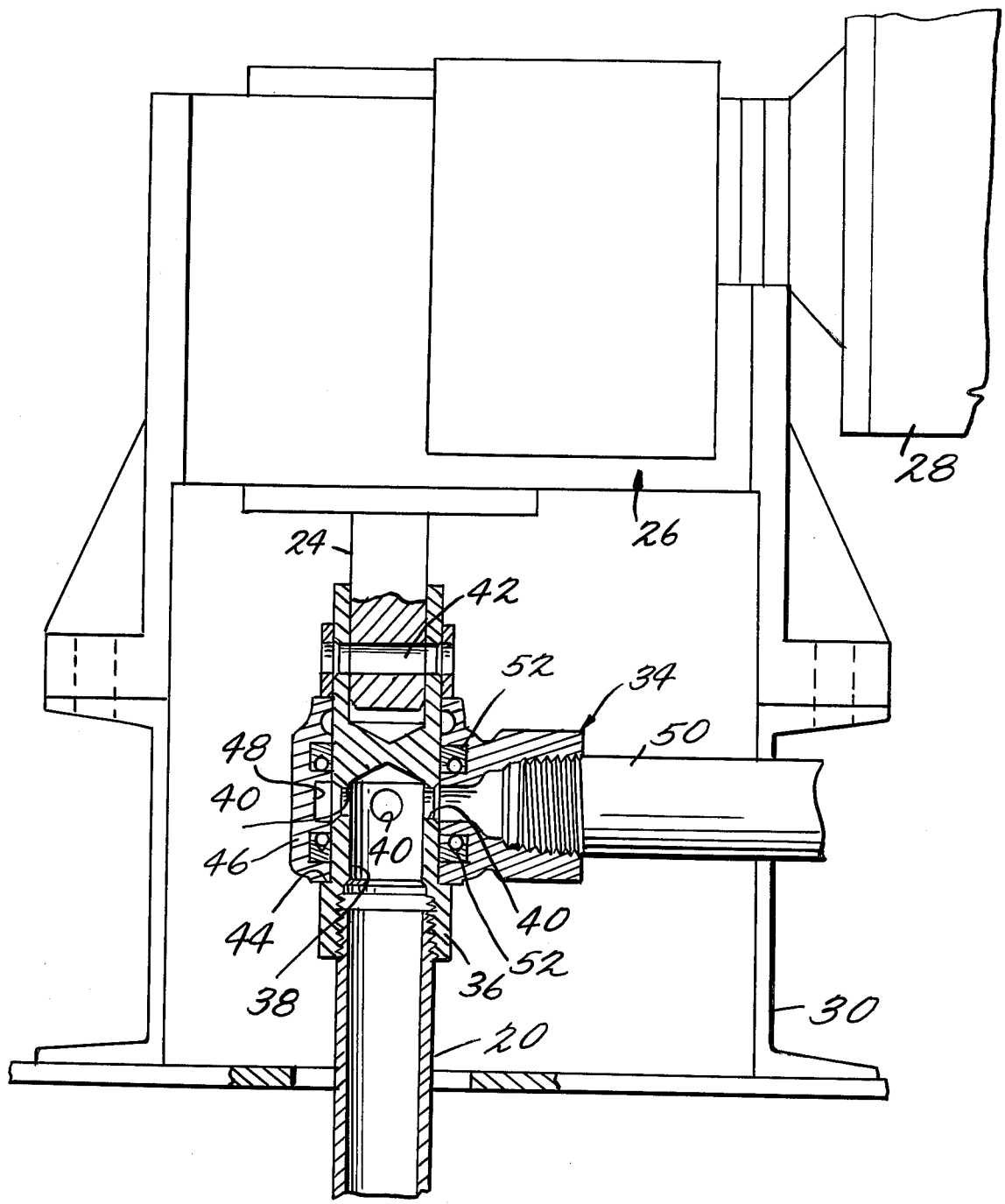

United States Patent [19]

Johnston et al.

[11] 4,100,610
[45] Jul. 11, 1978

[54] ROTATING NOZZLE SPARGING SYSTEM FOR SUSPENSION FERTILIZER TANKS

[75] Inventors: Douglas Johnston, Decatur; Robert L. Jannen, Huntsville, both of Ala.

[73] Assignee: John Blue Company Division of Subscription Television, Inc., New York, N.Y.

[21] Appl. No.: 643,644

[22] Filed: Dec. 23, 1975

[51] Int. Cl.² .......................... B01F 7/16; F16K 31/12
[52] U.S. Cl. .................. 366/102; 137/505.13; 261/93; 366/169
[58] Field of Search ............... 259/DIG. 17, 108, 95; 261/93; 137/403, 453, 454, 494, 505 B

[56] References Cited

U.S. PATENT DOCUMENTS

| 2,192,115 | 2/1940 | Ware | 259/95 |
| 2,458,061 | 1/1949 | Coulter | 259/108 |
| 2,559,518 | 7/1951 | Smith | 259/108 |
| 3,948,285 | 4/1976 | Flynn | 239/570 |

FOREIGN PATENT DOCUMENTS 699,304  12/1964  Canada .................................. 259/108

*Primary Examiner*—Steven L. Stephan
*Attorney, Agent, or Firm*—Cushman, Darby & Cushman

[57] ABSTRACT

A storage tank for liquid suspensions is shown, requiring sparging or agitation to prevent settling or salting out of somewhat insoluble suspended solids wherein the agitation is provided by movable high energy jets produced by nozzles that direct streams of compressed gas toward and under the precipitated agglomerations of solid particles. The apparatus includes means for distributing the energy of the compressed gas evenly over the surface area upon which the precipitate is deposited whereby to apply the needed agitation to all areas covered by deposits. The invention includes structural aspects for mounting the sparging apparatus on the top of the tank and suspending the moving agitators to extend downwardly into the tank to a position over the floor of the tank upon which the salting out takes place.

6 Claims, 5 Drawing Figures

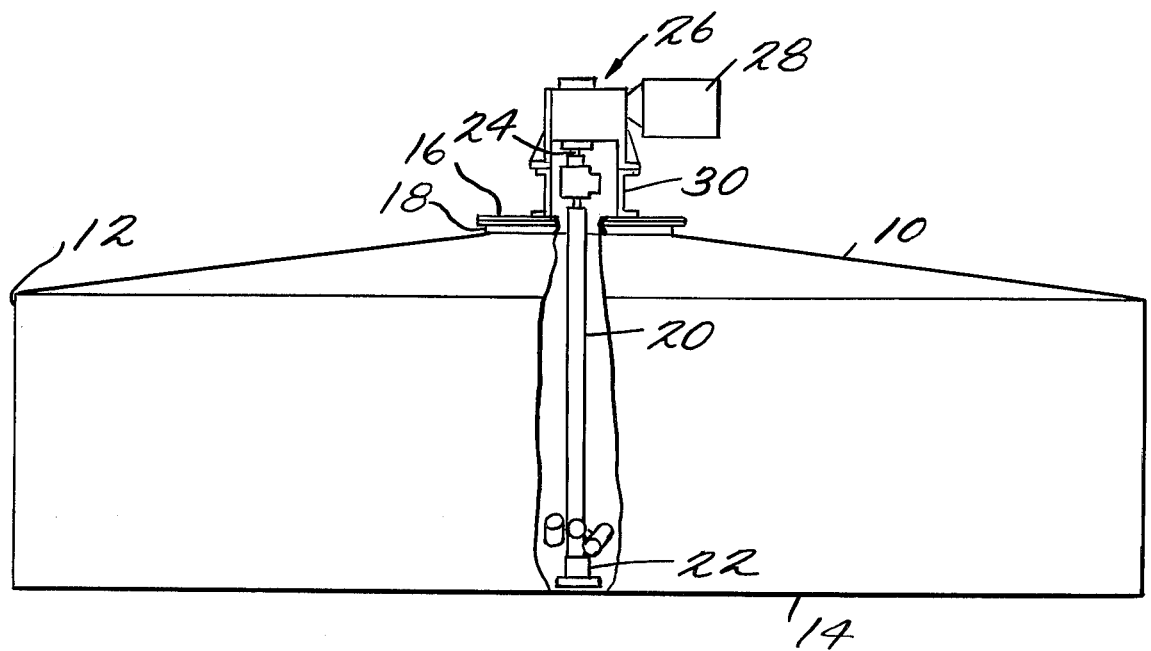
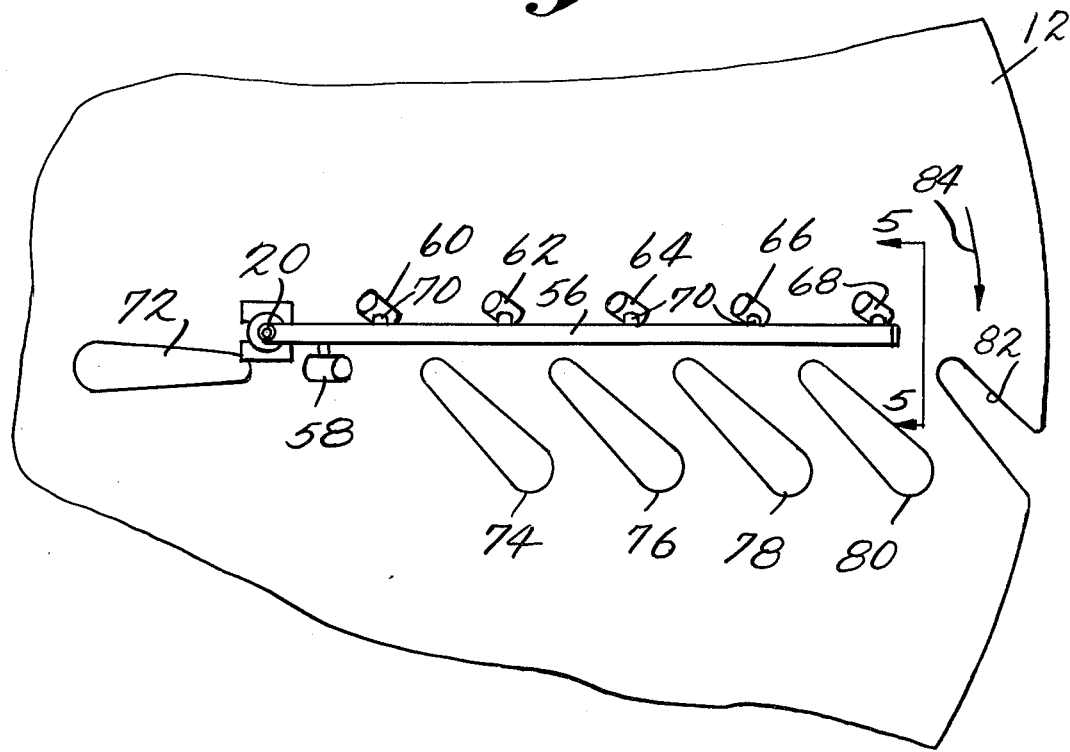

ROTATING NOZZLE SPARGING SYSTEM FOR SUSPENSION FERTILIZER TANKS

BACKGROUND

Many fluids used commercially contain suspensions of solids in the form of micro-sized particles that are difficult to dissolve and even in the presence of suspending agents tend to deposit or salt out of the solution to a greater or lesser degree. In order to maintain such liquid suspensions uniform to be ready for their intended use, agitation must be provided to maintain the solids uniformly distributed throughout the liquid mass.

One example of such a liquid is found in the agricultural industry where liquid fertilizers are used. In recent years various nutritive additives have been incorporated in such fertilizers in the form of micro-sized particles that are relatively insoluble in the liquid. Much thought has been given to problems involved in the storage and handling of these concentrations of plant foods including suspensions, for example, of potassium chloride, which is relatively insoluble in the typical liquid fertilizer carrier. This is true even when as much as 2% of attapulgite clay is used as a dispersing agent. It has been found that unless such a liquid fertilizer composition is agitated from time to time, that the more insoluble components tend to deposit or salt out on the floor of the bulk storage container.

On large farms where these liquid fertilizers are used in large volume, storage tanks 10 feet or more in diameter and 18 feet high are used to contain such suspensions until they can be delivered to spayer means to be distributed to the crops. If the insoluble components are allowed to salt out on the floor of the containers, difficult problems arise requiring periodic cleaning of the containers under difficult circumstances and, of course, due to the salting out process, some nutrients are lost from the fertilizer composition resulting in an uneven application of fertilizer to the crops.

Various agitating means have been proposed for use in the past for maintaining the solids suspended in liquids stored in large tanks, one such agitating means as is shown in the patent to Horton U.S. Pat. No. 3,378,237. Another known agitator that has been used heretofor is the air bubble agitator shown in the John Blue Company catalogue, form 12-GG-2, issued January 1972, copy of which is attached hereto.

While such known devices have been useful, the present invention has been made to provide an improvement on these known agitating means.

BRIEF DESCRIPTION

This invention makes use of a compressed gas sparging apparatus wherein jets of gas are driven forcible against any surface where agglomerations of crystals deposit or salt out of the solution. The direction of the jet blast is controlled to drive at the agglomeration where it has attached itself to this surface of the container. Thus the agitating compressed gas jets attack the agglomerations to drive them back into solution by agitating the liquid and in addition, the energy of the jet tends to break the attachment of the agglomerations to the container wall whereby to cause more areas of the deposited agglomerations to be exposed to the circulating fluid and to further agitate the agglomerations by tumbling them over the surface of the container exposed to the jet blasts. The gas bubbles from the jets further agitate the entire body of the liquid composition as they float to the top of the fluid stored in the tank.

The invention includes an apparatus for supporting and driving the compressed gas jet producing means whereby to mount the nozzles for producing the jets in a manner to efficiently cover the area of a large cylindrical storage tank upon which the solids are deposited when they salt out of the liquid. The apparatus provides a structure for uniformly distributing the sparging or agitating energy over the entire surface to be cleared.

It is therefore an object of this invention to provide an improved agitating means for maintaining the uniform distribution of minute particles of a somewhat insoluble material suspended in a liquid carrier by periodically providing a uniform and energetic agitation to any of such solids as deposit out of the solution on a surface and for simultaneously, periodically stirring the liquid bath.

It is another object of the invention to provide an apparatus for directing energetic compressed gas jets against a surface to be cleared of agglomerations of solids precipitating out of a solution.

Another object is to provide an apparatus for directing compressed gas jets against agglomerations of salts or solids, precipitated out of a solution to blast the agglomerations away from the surface upon which they have deposited and agitate the mixture to drive the precipitate back into a uniform suspension.

Another object of the invention is to provide a driven agitating apparatus that extends into the liquid to be agitated from above whereby to eliminate the necessity for providing sealing means for the drive means.

Another object is to provide an improved method for agitating insoluble material that deposits out of a liquid suspension to drive it back into suspension.

These and other objects will appear more fully below.

IN THE DRAWINGS

FIG. 1 is a sectional side elevation of a cylindrical liquid storage tank showing the agitating means of this invention assembled therein;

FIG. 2 is a detail sectional view showing the structure carried on the top of the storage tank for supporting and driving the agitating means;

FIG. 3 is a view looking along line 3—3 of FIG. 1;

FIG. 4 is a detailed sectional view showing one of the compressed gas nozzles for producing a jet of agitating gas to be directed against the deposited material; and FIG. 5 is an end view of the assembled header and nozzle system looking along line 5—5 of FIG. 3.

DETAILED DESCRIPTION

Referring to FIG. 1, the preferred form of the invention is shown mounted on a large cylindrical storage tank. The agitating means is mounted on the top of the tank and includes means reaching to the bottom or floor to direct jets of compressed gas against any agglomerations of solids that tend to deposit or salt out of the stored liquid suspension onto the floor of the storage tank. The action of the compressed gas flowing from the nozzles agitates the entire body of liquid in the tank and the jets are particularly designed to sparge the agglomerations of solid particles to cause the particles to all be redissolved or resuspended in the liquid. It has been found that periodic agitation applied forcefully enough is usually sufficient to maintain the uniformity of the conventionally used agricultural fertilizer suspensions.

In FIG. 1, the means for supporting and driving the sparging or agitating means is shown mounted on the top 10 of the large cylindrical storage tank having a side wall 12 and floor 14. For ease in mounting and servicing the stirrer, it is adapted to be carried on the top of a manhole cover 16 supported on the flange 18 surrounding a manhole provided in the top of the tank.

The stirrer or agitating means suspended from the structure on cover 16 includes a hollow drive shaft 20 extending from above the top of the tank to the bottom thereof. It is to be noted that the drive shaft for the agitator enters the tank without requiring any sealing means. At the bottom of the tank, the shaft 20 is supported for rotation in a bearing 22. The upper end of the drive shaft is ultimately supported from the output shaft 24 of a motor drive means as will be described more fully below. The motor assembly includes a motor 28 that drives a gear reduction unit 26 for rotating drive shaft 20 whenever agitation of agglomerations depositing on the top of floor 14 is desired. The motor and gear reduction unit are fixedly supported on the top of the manhole cover 16 on the rigid channels 30 in order to expose the upper end of the hollow shaft 20 above the top of the tank for connection to a 500 gallon compressed air tank or other gas supply (not shown).

As best seen in FIG. 2, the upper end of drive shaft 20 for the agitating means is suspended from a hollow rotary union 34. The rotary union has a rotatable center element 36 threadedly connected to drive shaft 20, the center element having an internal chamber 38 communicating with the hollow drive shaft 20. The chamber has inlet apertures 40 leading into it, there being a plurality of such apertures disposed at 90° with respect to each other. The upper end of the element 36 is adapted to telescopically receive the output shaft from the gear reduction unit 26 and a pin 42 fixedly connects element 36 to this shaft.

The rotatable center element 36 has a shoulder 44 on its outer periphery for supporting a relatively stationary gas header 46. The gas header has a compressed gas feed channel 48 formed internally that cooperates with apertures 40 to deliver compressed gas into the hollow drive shaft 20. A compressed gas supply is fed to channel 48 through inlet pipe 50 which engages against the channel 30 as the rotatable center 36 is driven. The gas header is provided with suitable seals 52 between channel 48 and the rotatable center element 36 to confine the flow of compressed gas to force it to flow into the hollow drive shaft 20 of the agitating means.

At its lower end, drive shaft 20 is supported on an integral rotatable bearing element 54 that is centered in the bearing 22 supported on the floor 14. The bearing 54 forms a plug in the lower end of the hollow drive shaft 20 and just above the top end of bearing 54, a cantilever supported horizontal header 56 is connected to the hollow drive shaft 20. The header communicates with the hollow drive shaft and compressed gas flows freely from the drive shaft into the header. The drive shaft 20, bearing element 54 and header 56 are made sufficiently rigid so that the header is supported in a manner to be driven through the body of liquid in the storage tank, header 56 sweeping over the entire area of the floor 14 as shaft 20 is rotatably driven.

The header 56 supports a series of compressed gas nozzles 58, 60, 62, 64, 66 and 68. Each of the nozzles communicates with header 56 through infeed connections 70 and the respective nozzles are fixedly positioned by these connections in an angular relationship to the header to produce an instantaneous compressed gas jet pattern on the surface of floor 14 that is indicated by the patterns 72, 74, 76, 78, 80 and 82 respectively. As the header is rotatably driven around in the direction of the arrow 84 in FIG. 3, it is apparent that the several instantaneous gas jet patterns follow overlapping annular paths that cover the entire area constituting the surface of the floor. The particular gas jet pattern that bears reference numeral 82 sweeps the outer periphery of the floor to the side wall 12 of the tank and the gas jet pattern 72 produced by nozzle 58 that is directed in a generally opposite direction as compared with the direction in which the other nozzles are pointed, covers an annular path at the center of the tank surrounding the axis about which shaft 20 rotates. Thus, when the compressed gas is turned on, the entire surface of floor 14 is sparged with each revolution of the drive shaft as the compressed gas jets impinge upon the area to be agitated.

Figure 4:
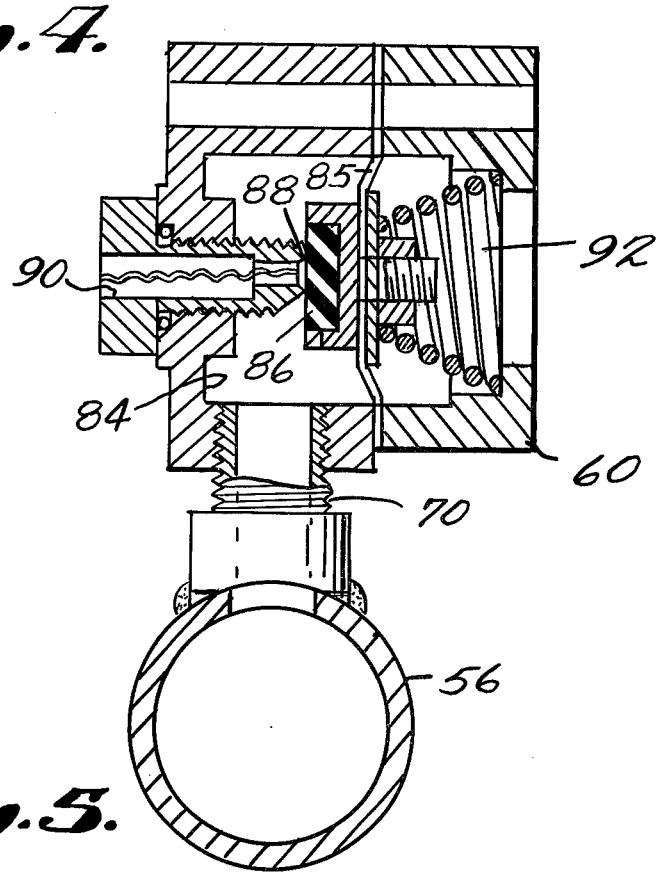

The compressed gas is supplied from a compressed gas reservoir into the inlet 50 to flow through gas header feed channel 48 into the hollow drive shaft 20. The gas pressure preferred for use in a liquid storage tank 10 feet 8 inches in diameter and 18 feet high adapted for storage of a liquid fertilizer including potassium chloride dispersed in 2% attapulgite clay, is about 150 pounds per square inch. The compressed gas may be air and is delivered into the header 56 to pass through connections 70 into the nozzles 58, 60, 62, 64, 66 and 68. Referring to FIG. 4, the compressed gas flows into a typical nozzle 60 from its connection 70 and enters chamber 84 that is sealed with a flexible diaphram 85. A suitable automatically opened valve is built into each nozzle and as represented in nozzle 60, a valve disc 86 fixedly attached to diaphram 85, is urged by spring 92 to seal against a seat 88 surrounding the entrance to the outlet passage 90 of nozzle 60. The disc is urged by spring 92 to fit bubble tight against seat 88 until the pressure in chamber 84, acting against diaphram 85, reaches a pressure that is about twice the static pressure of the liquid on the floor of the tank. In the example described above, the spring 92 would be designed to open and close valve disc 86 at a pressure of about 25 pounds per square inch.

Figure 5:
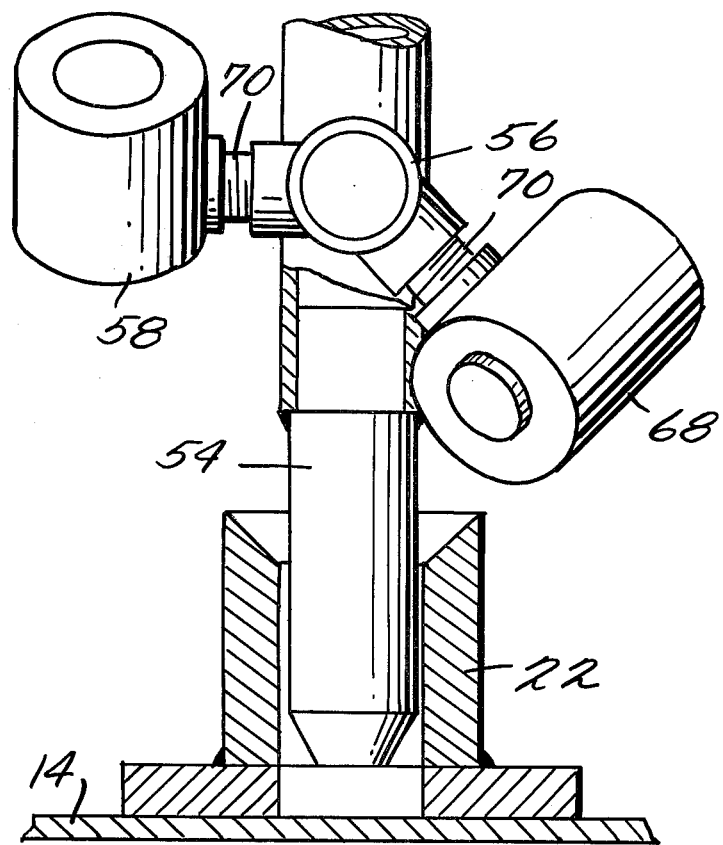

When the tank is to be sparged, compressed gas is turned on and flows into chamber 84 as the pressure builds up against diaphram 85, the spring 92 is compressed, valve disc 86 is retracted from seat 88 and compressed gas is allowed to flow through outlet 90 of the nozzle 60 to produce the instantaneous pattern 74. When the compressed gas is turned on, the motor 28 is simultaneously energized and the header 56 is driven with shaft 20 to sweep the entire surface of the floor of the tank. Each of the jets of compressed gas issuing from the respective nozzles, as shown in FIG. 3, is directed forwardly with respect to the direction of header motion and outwardly toward wall 12. As shown in FIG. 5, each of the jets is directed downwardly onto the surface of floor 14 so that each one of the compressed air jets is active to apply an agitating force to the floor in a direction that tends to get under and lift any agglomerations of solids off of the floor.

The compressed gas jets are used to actively agitate the agglomerations and the moving energy of the air bubbles further mixes the liquid around the surface of the solids to effect a redistribution thereof into the liquid. The bubbles bounce off the floor and then float to the top of the body of liquid to continuously agitate the agglomerations and stir the mass of the body of liquid as long as the compressed gas is fed to the sparging means. When the gas pressure is reduced, gas will flow from the nozzles until the pressure in chamber 84 is lowered to about twice the static pressure of the fluid standing in the tank and, as described above, with the typical liquid fertilizer containing a potassium chloride additive, at about 25 pounds per square inch pressure, spring 92 closes valve 86 against seat 88 while the compressed gas is still being supplied at a pressure to maintain a gas flow through outlet 90 to prevent a back flow of fluid into the nozzle when terminating the sparging action.

It has been found that with the potassium chloride liquid suspension described above, that with a 150 pounds per square inch compressed gas supply, and depending upon the liquid formulation, adequate sparging can be accomplished with the energized gas jet means here disclosed with a 90 second flowing cycle, performed only once or twice in every 24 hour period, during which time the header will make three sweeps of the entire surface of the floor.

The nozzles are designed to effect an average air jet blast having a velocity of 2000 feet per second to produce the required agitating action needed to redissolve any crystal deposits or break up agglomeration of solids that may deposit or salt out of the liquid suspension stored in the tank. When the valve closes under a positive pressure with respect to the liquid surrounding the header and while gas is still flowing to outlet 90 as above described, all liquid is sealed out of the valve and the nozzle cannot become clogged as has sometimes happened in other known air bubble agitating systems.

In order to produce a uniform sparging effect over the entire surface of the floor, the nozzles are sized differently depending upon the respective distances they are spaced from the axis of shaft 20. The different annular areas served by each nozzle obviously becomes progressively larger as the nozzle is situated closer to the perimeter of the floor and therefore to ensure a uniform quantity of air to be blasted against each square inch of the several annular areas covered, progressively the nozzles closer to the perimeter must be designed to deliver larger quantities of air against the respectively larger annular areas. For the size tank described above, the innermost nozzles 58 and 60 are provided with outlet orifices that are 1/16 of an inch in diameter. The outlets of the respective nozzles 62, 64 and 66 mounted progressively outwardly along header 56 at about 10 inch intervals have progressively larger orifice diameters until the nozzle 68 is reached and this nozzle has an outlet diameter of 7/32 of an inch in order to equalize the quantity of air distribution to each unit area of the floor being sparged.

While the above covers the description of the preferred form of this invention, the operation of the sparging apparatus should be apparent from the above specification. It is possible that modifications thereof may occur to those skilled in the art that will fall within the scope of the following claims.

I claim:

1. A sparging means for use in a cylindrical tank having a top, containing liquids having insoluble suspensions therein that may tend to deposit or crystallize out of the solution on a surface if the liquid is not agitated from time to time, comprising a source for a compressed gas, a distributor means for directing jets of compressed gas periodically against the area to be sparged, said means including a movable header for sweeping said area, means carried on said tank top to rotate said header about a vertical axis cyclically over said area, said drive means including a motor and a hollow shaft connected to said compressed gas source and adapted to be rotatably driven and connected between the motor and the header, said header being supported at the lower end of said shaft and being connected thereto to receive the compressed gas supplied to the hollow shaft, conduit means to deliver compressed gas to said header, a plurality of nozzles on said header and communicating with the compressed gas delivered thereto, each of said nozzles directing jets of compressed gas against different but overlapping confined portions of said area respectively whereby to produce a periodic agitating action over all of the area to be sparged with each cycle that said header sweeps the area, said nozzles being sized progressively to have outlet orifices of 1/16 inch at the end of the header adjacent said axis and 7/32 inch at the end of the header, said compressed gas being supplied in the form of air compressed to a pressure of 150 pounds per square inch, said nozzles having automatically actuated valves therein adapted to close at a pressure of 25 pounds per square inch, and said nozzles project a gas jet having a velocity of 2000 feet per second.

2. A sparging system for agitating a body of liquid in a tank and for removing deposits which may have settled from the liquid on to the tank bottom comprising: hollow vertical shaft means having an upper end and a lower end; a fixed sleeve having a bore which surrounds an upper portion and forms therewith an annular chamber; means above and below said chamber forming seals between said sleeve and said hollow shaft means; a compressed gas supply pipe connected to said annular chamber so that said supply pipe is in communication with the bore of said hollow shaft; a power-driven shaft disposed above and coaxial with said hollow shaft means and connected thereto; a horizontal header carried by a lower portion of said hollow shaft means, said header being in communication with the bore of said hollow shaft means; and a plurality of nozzles carried by said horizontal header in spaced-apart positions along the length of said header, each of said nozzles includes a hollow housing defining a chamber and having a nozzle outlet facing downwardly so as to direct jets of compressed gas against the bottom of the tank, a closure member mounted in said chamber for movement toward and away from said outlet and arranged to be biased toward said outlet by the pressure of the liquid in the tank, and mechanical biasing means applying a closing force on said closure member, said closure member being responsive to a predetermined high gas pressure in said chamber to move to an open position whereby the respective nozzle outlet does not become clogged with deposits when the system is not operating.

3. A sparging system as in claim 2 wherein said closure member is carried on one side of a diaphragm which forms a wall of said chamber, the other side of said diaphragm being exposed to the liquid in said tank and wherein said mechanical biasing means acts on said other side of said diaphragm.

4. A sparging system as in claim 2 wherein the outlets of said nozzles also face in the direction of rotation of said header.

5. A sparging system for agitating a body of liquid in a tank and for removing deposits which may have settled from the liquid on to the tank bottom comprising: a hollow vertical shaft of length sufficient to extend from above the surface of the body of liquid to essentially the bottom of the tank, said shaft being mounted for rotation about its axis; drive means for rotating said shaft about its axis; means for supplying compressed gas to the interior of said shaft; a horizontal header carried by said shaft at the lower end thereof and communicating with the interior of said shaft; a plurality of nozzles carried by said header is spaced-apart positions therealong, each of said nozzles having an outlet facing downwardly and in the direction of rotation so as to direct jets of compressed gas on to the bottom of the tank, said nozzles being arranged so that their jet patterns sparge overlapping annular areas of the tank bottom during rotation of said hollow shaft, each of said nozzles including a hollow housing defining a chamber and having a nozzle outlet therethrough, a closure member mounted in said chamber for movement toward and away from said outlet and arranged to be biased toward said outlet by the pressure of the liquid in the tank, mechanical biasing means applying a closing force on said closure member, said closure member being responsive to a predetermined high gas pressure in said nozzle to move to an open position whereby the respective nozzle outlet does not become clogged with deposits when the system is not operating.

6. A sparging system as in claim 5 wherein said closure member is carried on one side of a diaphragm which forms a wall of said chamber, the other side of said diaphragm being exposed to the liquid in said tank and wherein said mechanical biasing means acts on said other side of said diaphragm.

* * * * *